(12) United States Patent
Hammacher et al.

(10) Patent No.: US 9,296,567 B2
(45) Date of Patent: Mar. 29, 2016

(54) METHOD AND DEVICE FOR CONVEYING STRIP- OR PLATE-SHAPED PRODUCTS

(71) Applicant: LOESCH Verpackungstechnik GmbH, Altendorf (DE)

(72) Inventors: Heinz-Peter Hammacher, Bamberg (DE); Andreas Maiwald, Heiligenstadt I. Ofr. (DE)

(73) Assignee: LOESCH VERPACKUNGSTECHNIK GMBH, Altendorf (DE)

( * ) Notice: Subject to any disclaimer, the term of this patent is extended or adjusted under 35 U.S.C. 154(b) by 0 days.

(21) Appl. No.: 14/348,800

(22) PCT Filed: Sep. 17, 2012

(86) PCT No.: PCT/EP2012/068225
§ 371 (c)(1),
(2) Date: Mar. 31, 2014

(87) PCT Pub. No.: WO2013/050234
PCT Pub. Date: Apr. 11, 2013

(65) Prior Publication Data
US 2014/0246288 A1 Sep. 4, 2014

(30) Foreign Application Priority Data
Oct. 5, 2011 (DE) .......................... 10 2011 084 018

(51) Int. Cl.
*B65G 1/00* (2006.01)
*B65G 47/52* (2006.01)
(Continued)

(52) U.S. Cl.
CPC *B65G 47/52* (2013.01); *A23G 4/02* (2013.01); *B65G 47/24* (2013.01); *B65G 47/5181* (2013.01); *B65G 47/647* (2013.01); *B65G 57/32* (2013.01); *B65B 35/50* (2013.01)

(58) Field of Classification Search
CPC ............. B65G 47/261; B65G 47/5109; B65G 47/515; B65G 47/5181; B65G 47/24
USPC ........................................................ 198/347.1
See application file for complete search history.

(56) References Cited

U.S. PATENT DOCUMENTS 4,499,987 A    2/1985   Long
4,502,587 A *   3/1985   Clark .......................... 198/347.1
(Continued)

FOREIGN PATENT DOCUMENTS

CN     1229397     9/1999
CN     2858585     1/2007
(Continued)

*Primary Examiner* — James R Bidwell
(74) *Attorney, Agent, or Firm* — Cislo & Thomas, LLP

(57) ABSTRACT

A method and a device for conveying strip-shaped or plate shaped products utilizing the following steps and features: supply the products out of a continuously operating device to the conveying device; convey the products in succession in the conveying device; and transfer the products from the conveying device to a device for further processing. When the device for the further processing of the products is not ready for operation the products are store, then discharged when the device for the for the further processing of the products is ready for operation. Additionally, the products supplied into the conveying device is discharged out of the conveying device when the device for the further processing of the products is not ready for operation, the products are not able to be transferred to the further processing device, and when the storage device is completely filled with products.

20 Claims, 3 Drawing Sheets

(51) Int. Cl.
*B65G 47/51* (2006.01)
*B65G 47/64* (2006.01)
*B65G 57/32* (2006.01)
*A23G 4/02* (2006.01)
*B65G 47/24* (2006.01)
*B65B 35/50* (2006.01)

(56) References Cited

U.S. PATENT DOCUMENTS

| | | | | |
|---|---|---|---|---|
| 5,960,927 | A * | 10/1999 | Bahr | 198/347.1 |
| 2004/0244460 | A1 | 12/2004 | Xiong | |
| 2008/0006509 | A1* | 1/2008 | Zimmermann | 198/347.1 |
| 2010/0080673 | A1* | 4/2010 | Von Der Waydbrink et al. | 198/347.1 |
| 2011/0023422 | A1 | 2/2011 | Takayama | |
| 2014/0137517 | A1 | 5/2014 | Hammacher | |

FOREIGN PATENT DOCUMENTS

| | | |
|---|---|---|
| CN | 201457768 | 5/2010 |
| CN | 201538592 | 8/2010 |
| CN | 101848839 | 9/2010 |
| CN | 101985311 | 3/2011 |
| DE | 94 13 209 U1 | 11/1994 |
| DE | 94 13 2009 U1 | 11/1994 |
| DE | 195 35 937 A1 | 4/1997 |
| DE | 196 16 640 | 11/1997 |
| DE | 198 17 759 | 11/1999 |
| DE | 10 2011 075 439 | 11/2012 |
| EP | 0 274 229 | 7/1988 |
| EP | 0 729 706 A2 | 9/1995 |
| FR | 2 724 537 | 3/1993 |
| FR | 2 724 537 | 3/1996 |
| GB | 2 305 647 | 4/1997 |
| TW | 587630 U | 5/2004 |
| WO | WO 98/09894 | 3/1998 |
| WO | WO 2009/059876 | 5/2009 |

\* cited by examiner

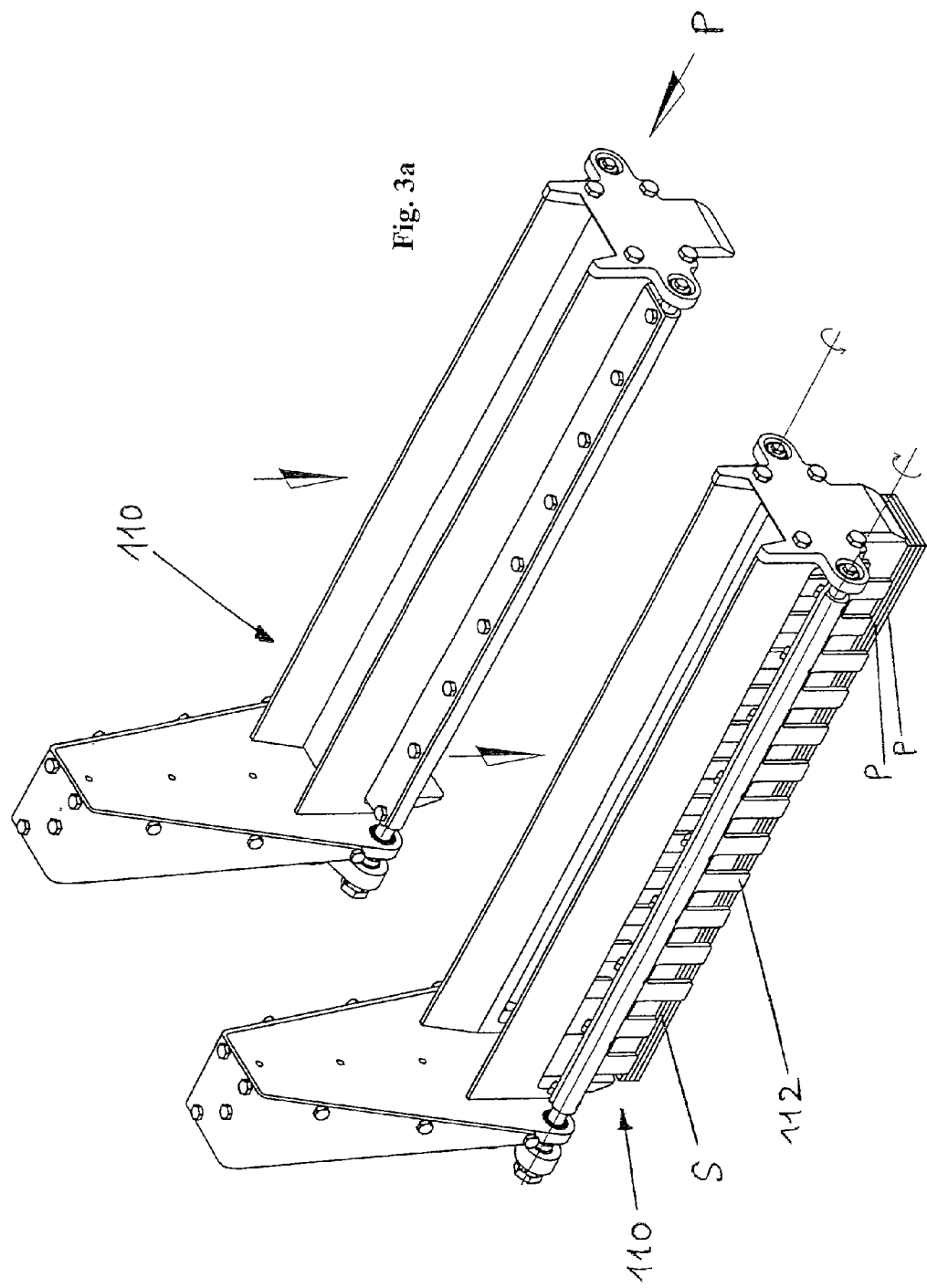

METHOD AND DEVICE FOR CONVEYING STRIP- OR PLATE-SHAPED PRODUCTS

TECHNICAL FIELD

This invention relates to a conveying method and system.

BACKGROUND

The invention relates to a method and to a device for conveying strip-shaped or plate-shaped products, corresponding to the preamble of claim 1 or the preamble of claim 10. In particular, the invention relates to a method of this type and to a device of this type for conveying primary products or intermediate products of the foodstuffs industry, in particular intermediate chewing gum products, from which during the course of further processing, subsequent to the conveying device according to the invention, individual product portions intended for consumption, in particular individual strips of chewing gum, are produced.

The invention is described below by way of chewing gum as the product to be conveyed as an example. Insofar as chewing gums, chewing gum strips or strip chewing gums or chewing gum slabs or sheets are mentioned below, this is to be understood purely as an example. Along with chewing gums, the present invention also relates to any type of flat, strip-shaped or plate-shaped objects, in particular to such objects, which as primary or intermediate products of the foodstuffs industry, are suitable for human consumption once they have been suitably further processed and portioned. In this connection, for example, these can also be primary or intermediate products of the baking and confectionery industry and the like. However, also included are flat, strip-shaped or plate-shaped products which are not intended for human consumption, such as, for example, medical or pharmaceutical products, such as medical diagnostic strips, blister packs, and the like.

The essential point in the case of all the objects of this type is that they are produced as a flat, strip-shaped or plate-shaped or mat-shaped primary or intermediate product in a continuously operating device and are then transferred to a device which is connected downstream in which they are conveyed further and in particular are processed further. Said latter further processing device, in this case, is in particular a device in which individual product portions (e.g. in this case individual strips of chewing gum intended for consumption) are formed from the delivered larger primary or intermediate product, the individual products created in this manner then being in particular also packaged individually or in groups in the further processing device.

In the case of chewing gums, such a further processing device is described, for example, in German Patent Application 10 2011 075 439. In the case of said chewing gum packaging machine, first of all larger rectangular plates, in particular strips, of chewing gum material are provided, out of which the individual strip-shaped chewing gum portions are then formed, said individual strips then being packaged individually and/or in groups. In the case of said and other known chewing gum packaging machines, the larger rectangular product plates delivered (so-called slabs) are provided at the machine input stacked in a magazine, out of which they are removed one after another and are inserted in succession into the packaging machine in which the individual product strips (chewing gum strips) are then formed out of the slab, and in which the individual strips are subsequently packaged and conveyed further.

In the case of known chewing gum packaging machines, the chewing gum primary products can also be delivered in the form of larger mats or plates (sheets) instead of in the named rectangular elongated form (slabs).

Said strip-shaped or mat-shaped or plate-shaped chewing gum primary products are typically produced in an endless strand in a rolling train, the product strips or product mats being detached from, in particular cut off, the endless strand and calibrated at the output of the rolling train. The production of said chewing gum strips or chewing gum plates in the rolling train is a continually running process which cannot be interrupted and stopped easily and/or in the short-term. Consequently, chewing gum strips or chewing gum mats (slabs or sheets) are continuously output from said producing device as primary products. Said chewing gum primary products, as described above, are then transferred to the further processing and packaging machine, from which they have to be continuously removed corresponding to the running delivery.

In the further processing and packaging machine the smaller chewing gum strips are then detached from the delivered primary product strips as individual portions. Insofar as the chewing gum primary product is delivered in the form of larger mats or plates, said mats/plates (sheets) are first of all divided into individual, larger product strips (slabs), said product strips are then divided, in turn, into the individual strips of the end products. Said detaching operation is effected, for example, as a result of forming a groove in the product and detaching the individual strips along the formed grooves. Experts call said process rolling and scoring.

In the case of the above-described process sequence, the problem arises that the further processing and packaging machine sometimes does not always operate continuously, uninterruptedly and error-free. For example, it is possible for a product jam and corresponding blockages or obstructions to arise in said machine, for products to be wrongly wrapped in the packaging material and for similar faults to occur. In order to eliminate these types of faults, the further processing and packaging machine has, where applicable, to be stopped. In said phase, however, the primary products (slabs/sheets) delivered to the machine input are not then able to be removed and supplied into the machine. On the other hand, the primary products, as described above, continue to be produced and delivered continuously, in succession, out of the endless strand by the producing machine, i.e. the product strips/product mats have to be removed continuously at the output of the producing machine. As a result of the process-typical characteristics of chewing gum production, it is typically not possible in any case to stop the production installation (strand roll train) easily and in the short-term, in particular in such cases in which the further processing machine has to be stopped as a result of faults. Consequently, the problem arises, in principle, that primary products are continually discharged from the producing machine, it sometimes not being possible, however, in the case of faults for said products to be removed continuously by the further processing machine. Typically, the products have then, among other things, to be stored intermediately and conditioned for these reasons.

SUMMARY

Proceeding from said disadvantages and problems in the case of the machines of the prior art, the object underlying the invention is to create an improved method or an improved device for the conveying and further processing of flat, strip-shaped or plate-shaped products where the disadvantages and problems provided in the prior art do not occur. In particular, it is to be made possible as a result of the method according to the invention and of the device according to the invention that the products are able to be discharged continually and continuously out of a producing machine, even when a further processing machine connected downstream is not immediately or seamlessly able to remove and further process said products in a continuous manner.

Said object is achieved according to the invention by a method and a device for conveying flat, strip-shaped or plate-shaped products, said method or device having the following method steps and device features: supply the products out of a continuously operating device, by means of which the products are produced, to the conveying device; convey the products in the conveying device in succession by way of conveying means; and transfer the products from the conveying device to a device by means of which the products are continuously further processed. The method according to the invention and the device according to the invention, in this case, are characterized by the following method steps and device features: accommodate the products supplied into the conveying device in a storage device when the device for the further processing of the products is not ready for operation and the products are not able to be transferred to the further processing device; discharge the stored products out of the storage device when the device for the further processing of the products is ready for operation again and the products are able to be transferred to the further processing device again; and discharge the products supplied into the conveying device out of the conveying device when the device for the further processing of the products is not ready for operation and the products are not able to be transferred to the further processing device and when the storage device is completely filled with products.

In the process sequence, the method according to the invention and the device according to the invention are consequently placed between the production of the flat, strip-shaped or plate-shaped primary products and the further processing and packaging of said products. Consequently, an interface between the production and the further processing/packaging of the products, by means of which the process steps of the production of the product and the further processing of the product and/or the packaging of the product are detached and decoupled from one another, is formed as a result of the method according to the invention and of the device according to the invention. In other words, a process which is connected upstream of the device according to the invention is decoupled from a process which is connected downstream of the device according to the invention. For this purpose, the method according to the invention and the device according to the invention provide a storing or buffering of the products delivered by the production process, which makes it possible for the delivered products not to have to be immediately, seamlessly transferred to the further processing device and not to have to be removed from said processing device. As a result, faults which possibly occur in the further processing process can be intercepted in such a manner that they do not obstruct the delivery of the products out of the production process. Consequently, with reference to an overall installation of product production and product further processing and product packaging compared to the prior art, the solution according to the invention results in less error susceptibility, smaller or shorter stoppage times and less scrap or waste of unusable products and consequently, all in all, in the overall installation having a higher productive capacity.

According to a preferred embodiment of the invention, the products stored in the storage device are discharged out of the storage device by means of conveying means and are transferred to the further processing device when this latter is ready for operation again. At the same time as said discharging operation, however, new products are already also being supplied from the product producing device into the conveying device and are conveyed in said conveying device by other conveying means and are transferred to the further processing device. The discharging of the stored products out of the storage device and the conveying of the newly supplied products in the conveying device, in this case, are controlled in such a manner that the stored products are discharged out of the storage device in succession in such a manner that each discharged product is placed in a substantially positionally correct or accurate manner onto one of the newly supplied products guided in the conveying device (piggyback as it were) such that said two products are then transferred together to the further processing device.

As, in this manner, more products arrive per unit time at the further processing device than in the case where the products are "passed through" directly from production to further processing without being stored intermediately in the storage device, the operating speed of the further processing device during the discharging of the products out of the storage device has to be controlled in such a manner and in particular increased that the further processing device is continuously able to process further all of the products transferred to it, whilst products from the product producing machine are supplied continuously and at constant speed to the conveying device.

It is provided in particular according to the invention that the products supplied from the producing device are discharged again directly out of the conveying device when the further processing device is not ready for operation and the products are not able to be transferred to the latter and when at the same time in particular the storage device is already completely filled with products. In a preferred embodiment of the invention, the products are output out of the conveying device in this connection to an accommodating device in which the products are collected. The collected products can then be supplied once again to the conveying device and/or transferred to the further processing device when the latter is ready for operation again. Said operation can be realized by suitable further conveying means, however it is typically carried out manually in particular by an operator of the overall installation.

According to a further embodiment of the invention, the characteristics, in particular the dimensions and/or the material quality, of the products supplied from the product producing device to the conveying device are detected by way of sensor devices, such products, the detected characteristics of which do not match predefined values, then being transferred out of the conveying device by means of suitable control devices and conveying means and not being transferred to the further processing device.

Further details and advantages of the invention are produced from the following detailed description of an exemplary embodiment by way of the accompanying drawings.

BRIEF DESCRIPTION OF THE DRAWINGS

FIGS. 3a and 3b show an enlarged perspective view of a detail of the conveying means for discharging the products out of the conveying device in two operating positions.

DETAILED DESCRIPTION OF THE INVENTION

Figure 1:
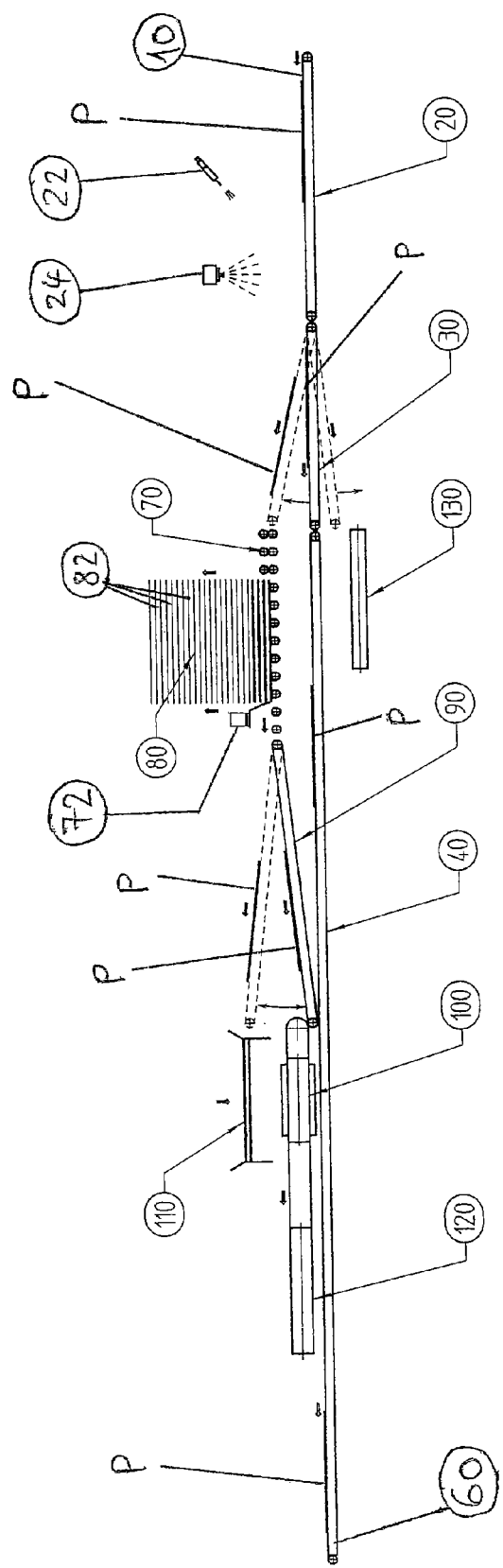
FIG. 1 shows a schematic view of the conveying device according to the invention from the side.

FIG. 1 shows a device for conveying flat, strip-shaped or plate-shaped products, the conveying direction in said representation running from right to left (cf. arrows in the drawing). The device (not shown) for producing the products P to be conveyed is situated in front of the input 10 of the conveying section (i.e. on the extreme right in FIG. 1). The products P are supplied from the producing device to the overall conveying device by means of the supplying device 20. The products P are then forwarded in succession in the conveying device by way of conveying means 30, 40. The device (not shown) for further processing and/or packaging the products P is situated behind the outlet 60 of said conveying device (i.e. on the extreme left in FIG. 1). The products are transferred from the conveying device to said further processing device by means of the conveying means 60.

The conveying device shown in FIG. 1 additionally comprises a storage device 80 in which the products P are able to be accommodated and in particular stored when the further processing device is (temporarily) not ready for operation and the products are consequently not able to be transferred to said further processing device. When the further processing device is subsequently ready for operation again and is able to accommodate products, the products stored (temporarily) in the storage device 80 are discharged out of said storage device. Devices 100, 110, 120, by means of which the products P supplied into the conveying device are able to be discharged out of the conveying device when the further processing device is not ready for operation and the products are not able to be transferred to it, and in particular when the storage device 80 is already completely filled with products, are arranged downstream of the storage device 80 in the conveying direction (i.e. to the left of the storage device in FIG. 1).

Details of the conveying device shown in FIG. 1 as well as of the passage of the products P through the conveying device are described in detail below. Insofar as conveyor belts are mentioned in this case, this is to be understood simply as an example since it is also possible to use other suitable conveying devices, for example chain conveyor devices and the like, along with conveyor belts for the conveying means or conveying devices.

The product strips P (in particular chewing gum strips) are taken over individually from the producing machine at the input 10 of the conveying device (i.e. on the extreme right in FIG. 1). In the producing machine the product strips P are detached (e.g. cut off with a knife) from an endless strand out of a rolling train and calibrated. The product strips P are introduced into the conveying device by means of the supply belt 20 and, at the same time, are accelerated in the conveying direction such that there is a spacing provided between two consecutive product strips P. Said spacing is necessary, among other things, so that the individual product strips are able to be recognized subsequently by the sensor system of the installation, which is necessary for controlling the subsequent individual method steps, as is explained below.

The supply belt 20 can be realized in particular as an inspection belt, i.e. certain characteristics of the product strip are detected in the region of said conveyor belt by means of suitable sensor and camera devices 22 as well as light sources 24. In this connection, in particular the dimensions and the quality or nature of the materials of the product strip are detected. As an option, a metal detector, which checks the product strip for possible metal content (e.g. as a result of inclusions of machine parts and the like which possibly fell down in preceding method steps) can also be provided in the region of the conveyor belt 20. Those products which are detected as faulty in this manner are removed out of the conveying device, as is described below.

The product strips P are transferred from the supply conveyor belt or inspection belt 20 to the following conveyor belt 30. The conveyor belt 30 is pivotable into three different positions at its rear end in the conveying direction (its left end in FIG. 1), as can be seen in FIG. 1. Depending on the pivot position of the conveyor belt 30, the product strips P are consequently steered along different conveyor paths. In this respect, the conveyor belt 30 can also be designated as a "points belt".

Insofar as has been ascertained in the region of the inspection belt 20 that certain characteristics of the product strip P do not match the predefined values, i.e. that the relevant product is consequently detected as faulty or "bad" because, for example, its dimensions do not match the desired predefined dimensions and/or because, for example, metal inclusions or other contaminants are present in the product, the points belt 30 in FIG. 1 is pivoted into its bottom position. In said position the product strips P are transferred from the points belt 30 to a following conveyor belt 130, by means of which said faulty products are removed out of the conveying device (so-called "filtering belt" 130). The direction of movement of the conveyor belt 130, in this case, runs perpendicular to the drawing plane in FIG. 1. In this connection, the conveyor belt 130 can operate, for example, such that the products are removed forward out of the overall installation (i.e. out of the drawing plane in FIG. 1) when, for example, simply the dimensions of the product do not correspond to the predefined values, but for the rest the product is in order. In this case, the product can be transferred from the filtering belt 130 to a product collecting device, from which the product is then sometimes transferred into or is fed back into the entire operating process again in order to be able to be processed once again and, for example, with regard to its dimensions, corrected (so-called re-working).

Insofar as has been ascertained in the region of the inspection belt 20 that in particular the material characteristics of the product are not in order (because, for example, metal parts are included in the product material), said product has to be separated out of the overall process as scrap, i.e. it is not allowed to be returned into the process again. In this case, the filtering belt 130 can move in the other direction, i.e. into the drawing plane in FIG. 1, and the product can be removed out of the installation in this way. Here too, said faulty products can be picked up once again by a collecting device.

As an option, it can be provided that the points belt is pivoted in a targeted manner into the bottom position by the operator of the installation by means of suitable control devices such that all the products P supplied by means of the conveyor belt 20 are immediately transferred out of the installation by means of the filtering belt 130, irrespective of whether they are "good" or "bad" (i.e. faulty) products.

Insofar as it has been ascertained in the region of the inspection belt 20 that the supplied product strips P are in order and all the definitive characteristics correspond to the predefined values, and insofar as at the same time the further processing machine and/or packaging machine connected downstream of the conveying device is ready for operation and is able to accommodate products, the conveyor belt 30 remains in the normal position (i.e. in the horizontal, central position in FIG. 1) or is pivoted into said position. The product strips P are then transferred from the points belt 30 to a following conveyor belt 40, from which the products P are transported directly to the output GO of the installation where they are then transferred to the further processing machine/ packaging machine which is connected downstream.

Insofar as has been ascertained in the region of the inspection belt 20 that the supplied product strips P are in order with regard to their characteristics, insofar as, however, the further processing device connected downstream is not ready for operation and the product strips are consequently not able to be transferred to said further processing device, the product strips are stored in an intermediate manner in the storage device 80. The conveyor belt or points belt 30 is pivoted into the top position shown in FIG. 1 for this purpose. The supplied products are consequently no longer transferred to the conveyor belt 40 to be forwarded directly to the further processing machine, but are now supplied to the storage device 80. In this case, the product strips P are transferred from the points belt 30 to a roller conveying device 70, by means of which the product strips are inserted into the storage device 80.

The storage device 80 is a so-called paternoster storage device, in particular a compartment device with several compartments 82 which, in each case, accommodate one product strip P. The strips P are in each case inserted into a compartment 82 of the storage device 80 in the longitudinal direction by means of the roller conveyor 70. To this end, a stop 72, which is arranged and aligned such that the product strip P inserted by the roller conveyor 70 into the relevant compartment 82 of the storage device 80 comes to rest precisely in the relevant storage compartment 82, i.e. does not project laterally beyond the storage compartment 82, is provided on the roller conveyor 70 downstream in the conveying direction at the (in FIG. 1) lateral or rear end of the storage device 80. The individual compartments 82 of the storage unit 80 are, for example, mounted side by side, or one on top of another in FIG. 1, on a circulating toothed belt. In a concrete embodiment, the storage unit 80 can comprise such compartments 82, for example, for accommodating 560 product strips.

The toothed belt with the compartments 82 mounted thereon is typically movable back and forth between two end positions, the product strips P being accommodated in succession in the individual compartments 82 when the storage device 80 is being filled, whilst said compartment device, proceeding from the first end position, is moved in succession in the direction toward the second end position. When the compartment device has reached the second end position and consequently all the compartments 82 are in each case filled with one product strip P, the storage device 80 is no longer able to accommodate any further product strips. In this case, the further product strips P supplied to the roller conveyor 70 by means of the points belt 30 are, for example, guided past the last filled compartment of the storage unit 80, the stop 72 being adjusted such that the product strips P arriving in the longitudinal direction no longer strike against it, but are allowed through and consequently are immediately output again by the roller conveyor 70 downstream of the storage device 80 and are transferred in particular to a next conveyor belt 90, by means of which they are conveyed further, as is further described below.

When the completely or partially filled storage device 80 is to be emptied again, in particular where the further processing machine connected downstream is once again ready for operation and is once again able to accommodate products, the compartment device of the storage unit 80 is moved out of the direction of the second end position back toward the first end position, the individual product strips P being pushed in succession out of the compartments 82 of the storage device 80 in the longitudinal direction by means of the roller conveyor 70 in an analogous reverse manner to the filling operation and being transferred in the conveying direction behind the storage device 80 to the next conveyor belt 90 (so-called "filtering belt") and being removed by said belt.

The filling and the subsequent emptying of the storage device 80 are effected consequently in such a manner that when the storage device is emptied, that product P which was accommodated last in the storage device during the filling of said storage device is discharged first out of the storage device, and that consequently that product which was accommodated first in the storage device is discharged last out of the storage device. The storage device 80 consequently operates according to the first in last out principle.

When the further processing machine/packaging machine is ready for operation again after an interruption and consequently products no longer have to be stored or buffered in an intermediate manner in the storage device 80, the storage device 80 is emptied, as described beforehand. The product strips P supplied from the producing device continuously to the overall conveying device are now not supplied to the storage device 80 by means of the roller conveyor 70, but are transferred by means of the points belt 30, which is in the (center) normal position, to the following conveyor belt 40 and are conveyed by said conveyor belt to the output 60. At the same time, the products discharged from the storage device 80 are transferred to the filtering belt 90 and are conveyed further by said belt. In this case, the products conveyed by the filtering belt 90 are transferred to the conveyor belt 40, i.e. supplied to the product stream conveyed in a regular manner by said conveyor belt. The speed of the conveyor belts (in particular of the filtering belt 90), in this case, is controlled such that each product strip supplied to the conveyor belt 40 by means of the filtering belt 90 is placed in a positionally precise or accurate manner (piggyback) onto a product strip conveyed on the conveyor belt 40. The two product strips then lying one on top of the other are then conveyed further by the conveyor belt 40 and are transferred together at the output 60 to the further processing machine. In a concrete embodiment, a product strip supplied by means of the filtering belt 90 is not placed in each case onto each product strip arriving by means of the conveyor belt 40, but simply onto every $n^{th}$ product strip. For example, n=8 can apply in a concrete embodiment.

Whilst the storage device 80 is being emptied, more product strips P are consequently transferred to the following packaging machine per unit time than in the case of normal conveying (i.e. the case where simply conveying by means of the conveyor belt 40 is carried out without including further product strips by means of the filtering belt 90). In said phase of emptying the storage device 80 the process speed of the further processing machine connected downstream is increased in such a manner that it is able to process all of the product strips P transferred to it in a continuous manner. The operating speed of the packaging machine connected downstream, in this case, is regulated in particular by means of a sensor system provided in the conveying device or by means of the higher-ranking control means thereof, in particular by means of sensors provided in the region of the conveyor belts 30, 40 and 90 for detecting the respective location or position of the product strips, suitable control devices being coupled with said sensors. The conveyor belts 30, 40 and 90, over and above this, are driven by servomotors such that, all in all, it is possible to determine the position, measure the length and track the path of the product strips, by means of which the conveying of the product strips through the overall installation is controlled in a fully automatic manner.

In this way, consequently the operating speed of the packaging machine connected downstream is also controlled in the phase of emptying the storage device 80, it being calculated using a so-called elevation factor on which product strip of the product stream conveyed on the conveyor belt 40 in each case a further product strip, which is supplied to the product stream on the conveyor belt 40 by means of the filtering belt 90, is placed. As soon as the storage device 80 is emptied, the control means causes the packaging machine connected downstream to run at the normal operating speed again since now only the regular amount of product strips is supplied by means of the conveyor belt 40. Whilst in the phase of emptying the storage device 80 the operating speed of the packaging machine connected downstream is therefore increased, the speed on the conveyor belts 20, 30 and 40 of the conveyor device, however, is not changed and in particular not increased.

The case where the further processing machine/packaging machine which connects to the conveying device is not ready for operation, i.e. is not able to accommodate any products, and where at the same time the storage device 80 is already completely filled with products, is looked at below. As has already been described beforehand, the product strips P supplied from the producing device are supplied to the roller conveyor 70 by means of the points belt 30, which is now situated in its top position (shown in FIG. 1). As, however, the products strips are now no longer able to be accommodated in the storage device 80, they are output directly onto the conveyor belt (filtering belt) 90 from the roller conveyor 70. The conveyor belt 90 can be realized such that it is able to assume two operating positions, as is shown in FIG. 1. In a first position (in FIG. 1 pivoted down), the conveyor belt 90 guides the products onto the conveyor belt 40, as has been described above. However, this is only admissible when the products are able to be transferred at the outlet 60 to the packaging machine connected downstream. If the outlet 60 is closed due to a lack of readiness for operation on the part of the packaging machine, the conveyor belt 90 is pivoted into its second position (top in FIG. 1), as a result of which the product strips P conveyed by the conveyor belt 90 are now able to be transferred to further conveying devices 100, 110, 120 connected downstream, which are shown in a top view in detail in FIG. 2 and in a further view of a detail in FIGS. 3a and 3b (so-called "manual removal").

Said further conveying devices (manual removal) which are connected downstream of the filtering belt 90 comprise in particular a funnel device 110 (see FIGS. 3a, 3b), onto which the product strips P from the conveyor belt/filtering belt 90 are transferred. Several product strips (e.g. one to three product strips) are collected in the funnel device (feeding funnel) 110, i.e. stacked one on top of another corresponding to their successive supply (stack S). As a result, it is possible to compensate for, among other things, periods of time which are necessary for changing subsequent accommodating devices (trays) to be filled with the product strips. The direction in which the product strips P are supplied to the funnel 110 is indicated by the arrow at the front on the right in FIG. 3a. An accommodating device T for collecting the product strips is held ready under the funnel 110. Said accommodating devices (trays) T are supplied into the region under the feed funnel 110 (cf. FIG. 2) by means of a feed belt 100 which is provided, for example, with cams or stops for the trays. In this case, said accommodating devices T can be realized, for example, such that they accommodate several stacks S of the product strips P which are arranged side by side and, where applicable, one on top of another. The accommodating devices T, in this case, are filled by means of the feed funnel 110 in particular in such a manner that, first of all, individual product strips P are collected in the funnel 110 and that the funnel is then opened and deposits the stack S of the collected product strips P downward onto the tray T (cf. FIG. 3b as well as the direction of the arrows above the funnel 110 in FIGS. 3a and 3b).

The feed funnel 110 can comprise, for example, toothed funnel flaps 112 which intermesh in an alternate manner and are mounted in each case by means of a rotational axis and are folded downward when the funnel is opened (cf. the rotational axes indicated at the front on the right in FIG. 3b). The opening movement of the funnel flaps 112, in this case, can be effected such that one of the funnel flaps 112 knocks by way of its outer surface against a product stack S which was already deposited on the tray T beforehand and displaces said product stack lightly to the side during the course of its opening movement such that space is made on the tray T for the next stack S to then be deposited anew on the tray T. As a result, stacks S which are deposited on the tray T one after another are also prevented from lying one on top of another or overlapping. The stacks S of product strips P are deposited in an ordered manner on the tray T in this way, as is indicated in FIG. 2.

Figure 2:
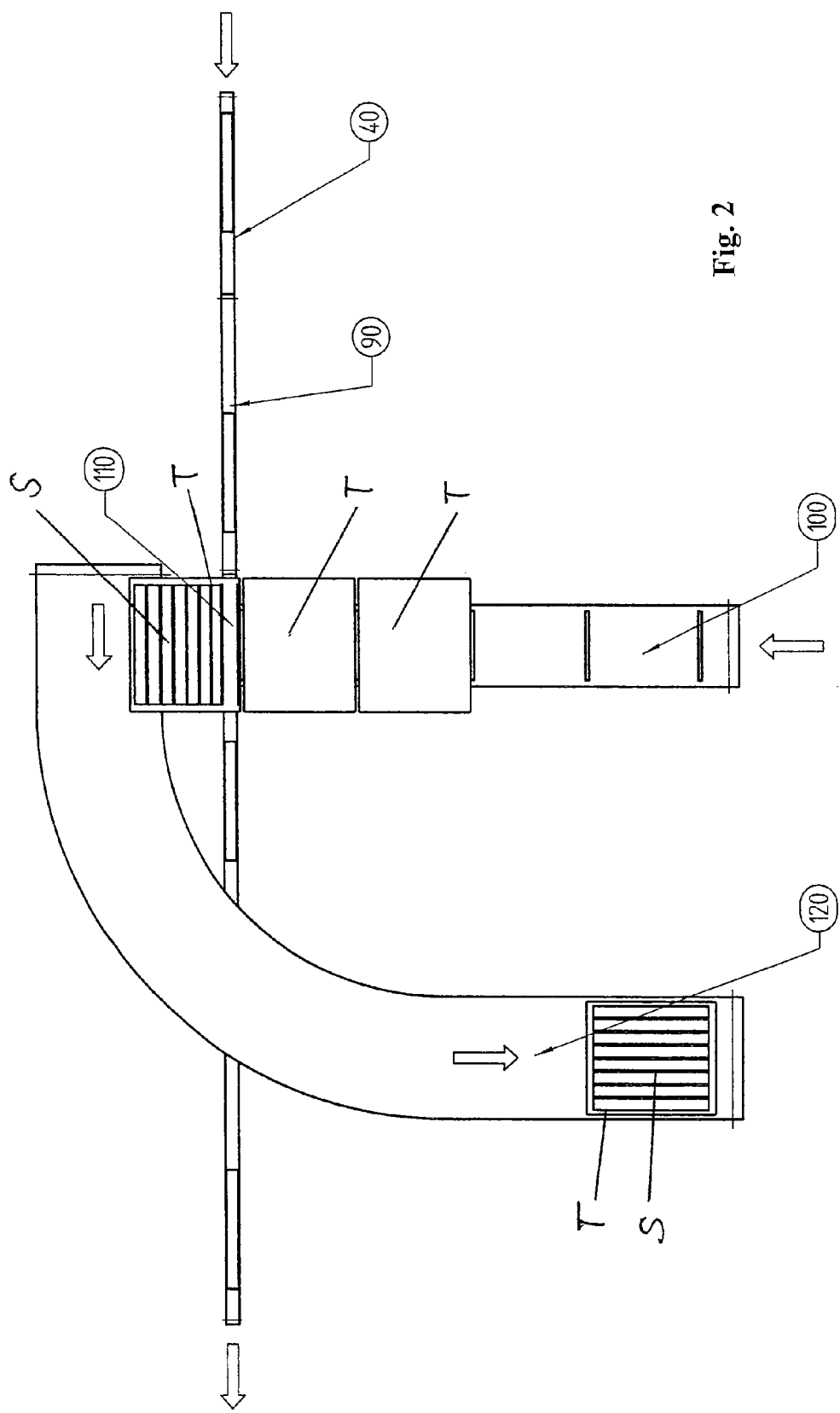
FIG. 2 shows a schematic top view from above of the conveying means for discharging the products out of the conveying device when the further processing device is not ready for operation and the storage device is filled completely with products.

The empty accommodating devices or empty trays T are placed onto the conveyor belt or tray feed belt 100 by an operator of the installation and inserted into the installation (in the direction of the arrow in FIG. 2). The trays are then, as described beforehand, automatically filled with product strips P (or product strip stacks S) by means of the filtering belt 90 and the feed funnel 110, the trays T being pushed forward in succession by the conveyor belt 100. As soon as a tray is completely filled with product strips P, it is transferred from the conveyor belt 100 to the following conveyor belt or removal belt 120, from which it is moved out of the installation (in the direction of the arrows in FIG. 2). At the end of the conveyor belt 120, the filled tray T is removed manually by the operator. From here, the product strips P can either be input once again into the conveying device or transferred directly to the further processing machine/packaging machine (in particular a product strip magazine of said machine).

As an option, it can be provided that the supplied product strips P are also able to be output by the installation operator directly into the manual removal 100, 110, 120 connected downstream by means of suitable control devices, even when the storage device 80 is not yet filled and could accommodate product strips per se when the packaging machine connected downstream is not ready for operation and is not able to accommodate any product strips.

For the case where the following packaging machine and also the manual removal 100, 110, 120 are not ready for operation and the storage device 80 is also already completely filled, it can be provided that the product strips P which were discovered to be "good" per se by the inspection belt 20 are transferred by means of the downwardly pivoted points belt 30 to the filtering belt 130 and by means of said belt are guided out of the installation. As has already been described in the introduction, in this respect the product strips can be separated out as scrap or supplied (manually) into the installation again.

In a corresponding manner, in the case where the operator does not remove the filled trays T from the removal belt 120 out of the installation such that the manual removal 100, 110, 120 is not ready for operation although the product strips supplied by means of the filtering belt 90 would have had to run into the manual removal in order to ensure a continuous product flow, the points belt 30 can be pivoted into its bottom position such that the product strips which were discovered to be "good" per se, as described beforehand, are removed out of the installation by means of the filtering belt 130 and in the individual case are separated out as scrap or are supplied (manually) into the installation again.

All in all, the production of the product is consequently decoupled from the processing or packaging of the product by way of the described conveying device such that any faults possibly occurring in the region of the further processing connected downstream do not affect the production of the products. The decoupling of the functions of the production of the product and of the further processing of the product or the packaging of the product, in this case, is realized in particular by the storage device 80, which serves as a "bypass" or buffer for the supplied products, as well as by the "manual removal" 100, 110, 120. By means of suitable sensor devices, control devices and servo drive devices, the product flow through the entire device can consequently be automatically adapted in a suitable manner to the given situation in each case.

The invention claimed is:

1. A method for conveying strip-shaped or plate-shaped products using a conveying device, said method having the following steps:
   (a) supplying the products out of a continuously operating, product producing device the conveying device;
   (b) conveying the products in the conveying device, the products following one another in succession;
   (c) transferring the products from the conveying device to a device for continuous further processing of the products (further processing device), the further processing device being intermittently ready for operation and not ready for operation;
   (d) storing the supplied products in a storage device in the conveying device when the further processing device is not ready for operation and when the storage device is not completely filled with products;
   (e) discharging the stored products out of the storage device to the further processing device when the further processing device is ready for operation, the further processing device having an operating speed; and
   (f) discharging the supplied products out of the conveying device when the further processing device is not ready for operation and when the storage device is completely filled with products, further characterized in that the stored products are discharged out of the storage device and transferred to the further processing device when the further processing device is ready for operation, while at the same time newly supplied products are conveyed in the conveying device and transferred to the further processing device, further characterized in that the discharging of the stored products out of the storage device and the conveying of the newly supplied products in the conveying device are controlled such that the stored products are discharged in succession out of the storage device in such manner that a discharged product is placed in a substantially positionally accurate manner onto one of the newly supplied products conveyed in the conveying device, wherein the discharged product and the newly supplied product are then transferred together to the further processing device.

2. The method as claimed in claim 1, further characterized in that the supplied products are stored in succession in the storage device, and in that the stored products are discharged in succession out of the storage device in such a manner that the product which was stored last in the storage device is discharged first out of the storage device, and in that the product which was stored first in the storage device is discharged last out of the storage device.

3. The method as claimed in claim 1, further characterized in that the discharged product is placed onto each $n^{th}$ product of the newly supplied products conveyed in the conveying device and is transferred to the further processing device together with said $n^{th}$ product, where n is a whole number greater than 1.

4. The method as claimed in claim 1, further characterized in that the operating speed of the further processing device during the discharging of the products out of the storage device is controlled in such a manner that the further processing device is continuously able to process all the products transferred to it, while products from the product producing device an supplied continuously and at a constant speed to the convoying device.

5. A method for conveying strip-shaped or plate-shaped products using a conveying device, said method having the following steps:
   (a) supplying the products out of a continuously operating, product producing device to the conveying device;
   (b) conveying the products in the conveying device, the products following one another in succession;
   (c) transferring the products from the conveying device to a device for continuous further processing of the products (further processing device), the further processing device being intermittently ready for operation and not ready for operation;
   (d) storing the supplied products in a storage device in the conveying device when the further processing device is not ready for operation and when the storage device is not completely filled with products;
   (e) discharging the stored products out of the storage device to the further processing device when the processing device is ready for operation, the further processing device having an operation speed; and
   (f) discharging the supplied products out of the conveying device when the further processing device is not ready for operation and when the storage device is completely filled with products, further characterized in that when the further processing device is not ready for operation and when the storage device is completely filled with products, the products discharged out of the conveying device are output to an accommodating device in which the products are collected, wherein the collected products are supplied once again to the conveying device, are transferred to the further processing device when the further processing device is ready for operation, or are both supplied once again to the conveying device and transferred to the further processing device when the further processing device is ready for operation.

6. The method as claimed in claim 5, further characterized in that several of the products which are discharged out of the conveying device are assembled together to form a stack and are output to the accommodating device as a stack.

7. A method for conveying strip-shaped or plate-shaped products using a conveying device, said method having the following steps:
   (a) supplying the products out of a continuously operating, product producing device to the conveying device;
   (b) conveying the products in the conveying device, the products following one another in succession;
   (c) transferring the products from the conveying device to a device for continuous further processing of the products (further processing device), the further processing device being intermittently ready for operation and not ready for operation;

(d) storing the supplied products in a storage device in the conveying device when the further processing device is not ready for operation and when the storage is not completely filled with products;

(e) discharging the stored products out of the storage device to the further processing device when the further processing device is ready for operation, the further processing device having an operating speed; and (f) discharging the supplied products out of the conveying device when the further processing device is not ready for operation and when the storage device is completely filled with products, further characterized in that characteristics, the characteristics including dimensions or material quality, of the products supplied from the product producing device to the conveying device are detected by way of sensor devices, and in that such products, the detected characteristics of which do not match predefined values, are transferred out of the conveying device and are not transferred do the further processing device.

8. A device for conveying strip-shaped or plate-shaped products, said device having the following features:

(a) devices for supplying the products out of a continuously operating, product producing device to the conveying device;

(b) conveying means for conveying the products in succession in the conveying device; and (c) devices for transferring the products from the conveying device to a device by means of which the products are continuously further processed (further processing device), the further processing device being intermittently ready for operation and not ready for operation, the further processing device having an operation speed; further characterized by the following features:

(d) a storage device for accommodating the products supplied into the conveying device when the further processing device is not ready for operation, and for discharging the stored products when the further processing device is ready for operation; and (e) devices for discharging the products supplied into the conveying device out of the conveying device when the further processing device is not ready fur operation and when the storage device is completely filled with products, further characterized by first conveying means for conveying the products supplied by the products producing device in succession in the conveying device, as well as by second conveying means which accommodate the products discharged out of the storage device and convey them further, wherein the first and the second conveying means convey products at the same time when the further processing device is ready for operation, further characterized by control devices which control the first conveying means and the second conveying means in such a manner that a product conveyed by the second conveying means is placed in a substantially positionally accurate manner onto one of the products conveyed by the first conveying means such that said two products are then transferred together to the farther processing device.

9. The device as claimed in claim 8, further characterized in that the control devices control the first conveying means and the second conveying means in such a manner that a product conveyed by the second conveying means is placed in each case onto each nth product of the products conveyed by the first conveying means, where n is a whole number greater than 1.

10. A device for conveying strip-shaped or plate-shaped products, said device having the following features:

(a) devices for supplying the products out of a continuously operating, product producing device to the conveying device;

(b) conveying means for conveying the products in succession in the conveying device;

(c) devices for transferring the products from the conveying device to a device by means of which the products are continuously further processed (further processing device), the further processing device being intermittently ready for operation and not ready for operation, the further processing device is having an operating speed;

(d) a storage device for accommodating the products supplied into the conveying device when the further processing device is not ready for operation, and for discharging the stored products when the further processing device is ready for operation; and (e) devices for discharging the products supplied into the conveying device out of the conveying device when the further processing device is not ready far operation and when the storage device is completely filled with products, and (f) a first conveying means for conveying the products supplied by the product producing device in succession into conveying device, as well as a second conveying means, which accommodate the products discharging out of the storage device and convey them further, wherein the first and the second conveying means convey products at the same time when the further processing device is ready for operation, further characterized in that when the further processing device is not ready for operation and the storage device is completely filled with products, the devices for discharging the products supplied into the conveying device out of the conveying device comprise a third conveying means as well as accommodating devices for collecting the products.

11. The device as claimed in claim 10, further characterized in that the storage device comprises a compartment device with several compartments, said compartment device being movable back and forth between two end positions, wherein each compartment accommodates a product, wherein the products are accommodated in succession in the storage device, while the compartment device, proceeding from the first end position, is moved in a direction toward the second end position, and wherein the products stored in the storage device are discharged in succession out of the storage device, while the compartment device is moved back to the first end position, wherein that product which was accommodated last in the storage device is output first from the storage device, and wherein that product which was accommodated first in the storage device is output last out of the storage device.

12. The device as claimed in claim 10, further characterized by control devices which control and in particular increase the operating speed of the further processing device during the discharging of the products out of the storage device in such a manner that the further processing device is able to process all the products transferred to it continuously, while products from the product producing device are supplied continuously and at a constant speed to the conveying device.

13. The device as claimed in claim 10, further characterized in that the third conveying means comprise a device for combining several of the products which are discharged out of the third conveying means to form a stack and for outputting the products to the accommodating device as a stack.

14. The device as claimed in 10, further characterized in that the third conveying means comprise a conveying device for supplying empty accommodating devices and a conveying device for removing filled accommodating devices.

15. The device as claimed in claim 10, further characterized in that the second conveying means are adjustable between a first position and a second position, wherein the second conveying means are situated in the first position when the further processing device is ready for operation and the products are transferred to the first conveying means, and wherein the second conveying means are situated in the second position when the further processing device is not ready for operation and the products are transferred to the third conveying means.

16. A device for conveying strip-shape or plate-shaped products, said device having the following features:
    (a) devices for supplying the products out of continuously operating, product producing device to the conveying device;
    (b) conveying means for conveying the products in succession in the conveying device;
    (c) devices for transferring the products from the conveying device to a device by means of which the products are continuously further processed (further processing device), the further processing device being intermittently ready for operation and not read for operation, the further processing device having an operating speed;
    (d) a storage device for accommodating the product supplied into the conveying device when the further processing device is not ready for operation, and for discharging the store products when the further processing device is ready for operation; and
    (e) devices for discharging the products supplied into the conveying device out of the conveying device when the further processing device not ready for operation and when the storage device is completely filled with products, further characterized by first conveying means for conveying the products supplied by the product producing device in succession in the conveying device, as well as by second conveying means which accommodate the products discharged out of the storage device and convey them further, wherein the first and the second conveying means convey products at the same time when the further processing device is ready for operation, further characterized in that the first conveying means comprise a points conveying means which is adjustable at least between a first position and a second position, wherein the points conveying means is situated in the first position when the further processing device is ready for operation and the products are able to be transferred to the further processing device, and wherein the points conveying means is situated in the second position when the further processing device is not ready for operation and the products are not able to be transferred to the further processing device such that the products are supplied to the storage device.

17. The device as claimed in claim 16, further characterized by sensor devices for detecting characteristics, the characteristics including dimensions or material quality, of the products supplied from the product producing device to the conveying device, by means of control devices coupled with the sensor devices, as well as by fourth conveying means controlled by the control devices for removing such products out of the conveying device, the detected characteristics of which do not match predefined values.

18. The device as claimed in claim 17, further characterized in that the points conveying means of the first conveying means is adjustable by the control devices into a third position in which the products, the determined characteristics of which do not match the predefined values, are transferred to the fourth conveying means.

19. The device as claimed claim 10, further characterized in that the strip-shaped or plate-shaped product is a primary product of the foodstuff industry, in particular an intermediate chewing gum product, out of which individual product portions, in particular individual strips of chewing gum, intended for consumption are produced in the further processing device.

20. The device as claimed in claim 19, further characterized in that the further processing device is a machine for packaging the chewing gum strips produced, individually or in groups.

* * * * *